United States Patent
Yang et al.

(10) Patent No.: US 7,733,004 B2
(45) Date of Patent: Jun. 8, 2010

(54) FIELD EMISSION DISPLAY DEVICE FOR UNIFORM DISPERSION OF ELECTRONS

(75) Inventors: Tzung-Han Yang, Taipei (TW); Jeng-Maw Chiou, Hsinchu (TW); Hung-Yuan Li, Hsinchu (TW); Chao-Hsun Lin, Hsinchu (TW); Shu-Hsing Lee, Hsinchu (TW)

(73) Assignees: Tatung Company, Taipei (TW); Industrial Technology Research Institute, Hsinchu (TW)

( * ) Notice: Subject to any disclaimer, the term of this patent is extended or adjusted under 35 U.S.C. 154(b) by 411 days.

(21) Appl. No.: 11/472,364

(22) Filed: Jun. 22, 2006

(65) Prior Publication Data

US 2007/0114910 A1  May 24, 2007

(30) Foreign Application Priority Data

Nov. 18, 2005  (TW) .............................. 94140615 A

(51) Int. Cl.
*H01J 63/04* (2006.01)
(52) U.S. Cl. ..................................... 313/495
(58) Field of Classification Search ......... 313/309–310, 313/311, 336, 493–498
See application file for complete search history.

(56) References Cited

U.S. PATENT DOCUMENTS

| 5,194,780 | A * | 3/1993 | Meyer ..................... 315/169.3 |
| 2003/0184357 | A1* | 10/2003 | Dijon et al. ................. 327/301 |
| 2004/0108515 | A1* | 6/2004 | Muroyama et al. .......... 257/144 |
| 2005/0067936 | A1* | 3/2005 | Lee et al. .................... 313/309 |
| 2005/0067937 | A1* | 3/2005 | Sheu et al. .................. 313/309 |
| 2005/0099112 | A1* | 5/2005 | Chiou et al. ................ 313/496 |
| 2005/0110394 | A1* | 5/2005 | Lee et al. .................... 313/497 |
| 2005/0168128 | A1* | 8/2005 | Kang ........................ 313/495 |

* cited by examiner

*Primary Examiner*—Toan Ton
*Assistant Examiner*—Hana A Sanei
(74) *Attorney, Agent, or Firm*—Bacon & Thomas, PLLC

(57) ABSTRACT

A field emission device (FED) includes a top substrate having an anode electrode and a phosphor layer, a lower substrate, at least one cathode electrode having an opening-pattern with at least one opening, an insulating layer located on the cathode electrode, a gate layer located on the insulating layer, and an electron emitter located in the opening of the cathode electrode. The electron emitter is adjacent to the cathode electrode and is electrically connected therewith. The cathode electrode having the opening-pattern is located on a bottom panel. Through the structure illustrated above, uniformity of emitting electron density can be improved and brightness and contrast of color for the FED can be enhanced.

18 Claims, 3 Drawing Sheets

FIELD EMISSION DISPLAY DEVICE FOR UNIFORM DISPERSION OF ELECTRONS

BACKGROUND OF THE INVENTION

1. Field of the Invention

The present invention relates to flat panel display devices, and more particularly to a field emission display device enabling a uniform dispersion of electrons.

2. Description of Related Art

Display devices have become increasingly important in modern life, where televisions, cellular phones, personal digital assistants (PDA), digital cameras, and personal computers and the Internet, rely on controlling displays to transmit information. In contrast to the traditional Cathode Ray Tube (CRT) displays, flat panel displays are superior as far as being lightweight, compact and friendly to human health. However, there are still problems to be solved in terms of viewing angle, brightness, power consumption.

Among newly developed technologies for flat panel displays, a field emission display (FED) has its special merit of high definition, equal to a CRT display, and unlike liquid crystal displays, does not have drawbacks in a narrower viewing angle, a smaller working temperature range, and a slower reaction. The FED has advantages in high production rate, a short response time, an excellent displaying performance, a brightness over 100 ftL, a lighter and thinner structure, a wide viewing angle, a greater working temperature range, and a higher action efficiency.

Further, an FED does not need a backlight module, and as such, an outstanding brightness can be obtained even under outdoor sunshine. Following developments of nanotechnologies, considerable emphasis has been placed on research of new materials which are introduced to electronic emission components. A carbon nanotube-field emission display (CNT-FED), which applies a theorem of point discharge, takes the place of an electronic point emission component. As a result, an FED has been considered competitive with an LCD, or even a substitute for an LCD in the future.

The working theorem of an FED is similar with that of a traditional CRT, where a luminescence is produced when electrons are "pulled out" by the points of cathode electrodes in an electric field of $10^{-6}$ torr vacuum condition, and are accelerated by a positive voltage of an anode plate so as to bombard a fluorescent material on the anode plate. Accordingly, electric field strength affects directly the number of electrons emitted from the cathode electrodes. In other words, the greater the electric field strength is, the higher the number of electrons emitted from the cathode electrodes. Consequently, in the case where the electric field strength fails to disperse uniformly, a problem of non-uniform elevation for the dispersion of electron emitters will result.

In a low-cost traditional screen-printing process, materials can take a formation only under a high-temperature sintering. Nevertheless, the materials subject to the high-temperature sintering are not able to form layers of even surfaces, or most likely collapse or deform. As a result, emitters formed on the surfaces of the cathode electrodes have a non-uniform elevation due to the problem of uneven surfaces of cathode electrodes.

Since every pixel of an FED possesses itself a corresponding field emission array, a non-uniform elevation of electron emitter dispersion will result in a problem of non-uniform electric field strength of inductance, and so cause non-uniform electron emitting density. This will result in an FED of non-uniform brightness, low contrast, inferior production rate and poor image quality of screen.

To solve the problem of non-uniform elevation for the dispersion of electron emitters, conventional art adds a surface-flattening process during a screen process and after sintering of materials among layers so as to obtain a structure of even surfaces on layers. In spite of the fact that through this process the above-mentioned problem can be solved, cost in making FEDs has been raised simply because of such a complex process.

Given the above, an FED of uniform dispersion of electron emitters is presently an urgent need, which not only makes a uniform dispersion of the electric field, but also results in a uniformity of electron emitting density, and thus provides a screen of high quality image.

SUMMARY OF THE INVENTION

The object of the present invention is to provide a field emission display device (FED), having merits in forming electron emitters on a substrate of even surface and adjacent to cathode electrodes with electric connections, so as to improve the problem of non-uniform elevation in dispersion encountered by conventional electron emitters. Further, an improved structure of the present invention can simplify the manufacturing process, making a better production rate achievable.

An object of the present invention is to provide a field emission device including a top substrate having a phosphor layer and an anode electrode, a bottom substrate, at least one cathode electrode having an opening-pattern, an insulating layer located on the cathode electrode, at least one gate electrode located on the insulating layer, and at least one electron emitter located inside an opening of the cathode electrode. The electron emitter is adjacent to the cathode electrode and is electrically connected therewith. The cathode electrode having the opening-pattern is located on a bottom panel. Through the structure illustrated above, the FED according to the present invention not only can provide a uniformity of electron emitting density, but also can enhance brightness uniformity and contrast of color.

In an FED according to the present invention, the number of the openings on the opening-pattern of the cathode electrode is not to be limited, preferably is at least one opening, and more preferably is a plurality of openings. When there are plural openings for the cathode electrode, the arrangement manner of the openings is not to be limited, but preferably is a formation of matrix M×N, where M and N are each an integer greater than zero.

Besides, the shape of the openings for the cathode electrode is not to be limited, but preferably is a square, a circle, a polygon, an ellipse, an irregular shape, or their combination. In addition to the above-mentioned formation of matrix M×N, the openings of the cathode electrode according to the present invention can be at least one groove, where the grooves can be arranged, preferably, to be parallel to a surface of the bottom substrate.

In the FED according to the present invention, the insulating layer located on the cathode electrode may include at least one opening, and preferably is a plurality of openings. When there are plural openings for the insulating layer, the arrangement manner of the openings is not to be limited, but preferably is a formation of matrix M×N, where M and N are each an integer greater than zero.

In one embodiment of the present invention, the openings of the insulating lay are the same as those of the cathode electrode. Of course, in the present invention the openings of the insulating layer are not necessarily the same as those of the cathode electrode. In other words, the openings of the insulating layer and of the cathode electrode can be adjusted in accordance with manufacturing processes.

In the present invention the electron emitters are positioned in the openings of the cathode electrode, and the height of the electron emitters in the openings of the cathode electrode is not to be limited, but preferably is able to fill the openings of the cathode electrode. In the case where the insulating layer has openings the same as those of the cathode electrode, the electron emitters can both be located in the openings of the cathode electrode and of the insulating layer, and preferably adjacent to the cathode electrode and the insulating layer, and are in an electric connection with the cathode electrode, such that the heights of the electron emitters in the openings of both the cathode electrode and the insulating layer are not to be limited.

In the present invention, the shape of the electron emitters in the openings of the cathode electrode is not to be limited, but rather electron emitters are adjacent to the cathode electrode and are electrically connected therewith. To be specific, the shape of the electron emitters may preferably be "dot-like" or "annular." The shape or the dimension of the electron emitters can be appropriately adjusted in consideration of manufacturing cost, emission efficiency of electrons, or the openings of the cathode electrode.

The gate electrode adopted in the present invention can be of any kind as used in a conventional FED, but preferably is a plurality of gate electrodes separate from one another or integrally made as a single gate electrode plate. The "plural gate electrodes" can be "annular gate electrodes" or other shapes, where the gate electrodes are in a "one-to-one" or "one-to-plural" relationship with the plural electron emitters.

Because each pixel displayed in the FED itself owns a corresponding field emission array, and the electron emitter emits electrons in between the cathode electrode and the gate electrode under a biased voltage, the configuration of the gate electrode, of the cathode electrode and of the electron emitter can be constructed interrelatedly. As a result, the time that each electron emitter emits electrons can be precisely controlled so as to keep the time that every pixel displays accurate.

The electrons emitted from the electron emitter according to the present invention moves in an accelerated manner from the bottom substrate toward the top substrate due to the potential between the top substrate and the bottom substrate, where the electrons collide and excite the phosphor on the phosphor layer so as to produce a visible light. Therefore, the number of electrons and the uniformity of electron emitting density become the key factor of brightness and light density.

In order to gather electrons emitted from the electron emitters, or to multiply the number of electrons, or to isolate an influence resulted from the electrode at the top substrate over the electrode at the bottom substrate, the FED according to the present invention includes at least one metal plate having a plurality of openings, where the metal plate is located between the top substrate and the bottom substrate, so that the circuit of the FED can be controlled easily. In still another embodiment of an FED according to the present invention, the arrangement of the openings of the metal plate is not to be limited, but preferably is in a formation of matrix M×N, where M and N are each an integer greater than zero. Besides, the shape of openings for the metal plate is not to be limited, but preferably is a square, circle, a polygon, an ellipse, an irregular shape, or their combination. In addition to the above-mentioned matrix formation, the openings of the metal plate according to the present invention can be at least one groove, where the grooves can be arranged as, preferably, parallel to one another, namely the metal plate according to the present invention can consist of non-consecutive metal plates.

The number of the metal plates in between the top substrate and the bottom substrate is not to be limited. In fact, the location and the number of layers of the metal plates can be adjusted dependent on manufacturing processes.

In a preferred mode of the present invention, the "plural openings" involved in the metal plate happen to be in a "one-to-one" relationship with the openings involved in the insulating layer and the cathode electrode according to the present invention.

Referring to the openings of the metal plate, where each individual opening is shaped like two bowls attaching to each other at the bottoms thereof, the dimension of each opening is not to be limited, or specifically the dimensions of the two bowls in each opening can be equal or not.

The metal plate used in the FED according to the present invention can be of any metallic materials or alloys, but preferably is of the metallic materials or alloys having a surface capable of electron multiplication, such as silver-magnesium alloy, copper-beryllium alloy, copper-barium alloy, gold-barium alloy, gold-calcium alloy, tungsten-barium-gold alloy, ferro-nickel alloy, or a combination thereof; or of a metal oxides such as oxides of beryllium, oxides of magnesium, oxides of calcium, oxides of strontium, oxides of barium, or a combination thereof. Therefore, the FED according to the present invention can multiply the number of secondary electrons in the fluorescence so as to enhance brightness and contrast of colors for the pixels as a whole.

To improve the brightness and uniformity of the pixels for the FED according to the present invention, a potential can be applied to the metal plates other than to the anode electrode and the cathode electrode so as to multiply the number of secondary electrons, or to effectively gather the electrons emitted from the electron emitters.

The electron emitters according to the present invention may use any conventional electron emitting materials, but preferably is a carbon-based material, selected from the group of graphite, diamond, diamond-like carbon, carbon nanotube, fullerene ($C_{60}$), and the composite thereof. In one of the preferred embodiments of the present invention, a material of carbon nanotube is used for electron emitters, namely, a Carbon Nanotube (CNT) FED.

Further, in the FED according to the present invention the top substrate may include a black matrix layer, which is closely engaged with the fluorescent layer, so as to shield light leakage or to increase contrast. In the FED according to the present invention the bottom substrate may include a switch element connected with the at least one cathode electrode so as to energize the electron emitters adjacent to the cathode electrode. The switch element here referred to can be of any conventional active or passive switch element, but preferably is a thin film transistor (TFT), a thin film diode, or a matrix driving and scanning circuit.

Owing to the improvement made on the FED according to the present invention, not only can the electron emitters be formed directly on an even substrate surface, but also an electric connection can be maintained between the electron emitters and the cathode electrode. Consequently, the FED according to the present invention can greatly improve the problem resulted from non-uniformity of electron emitting density, and simplify the manufacturing process of the display and so to reduce the cost of manufacturing, making the FED more competitive and ultimately prevail in the market.

DETAILED DESCRIPTION OF THE PREFERRED EMBODIMENTS

Embodiment 1

Figure 1:
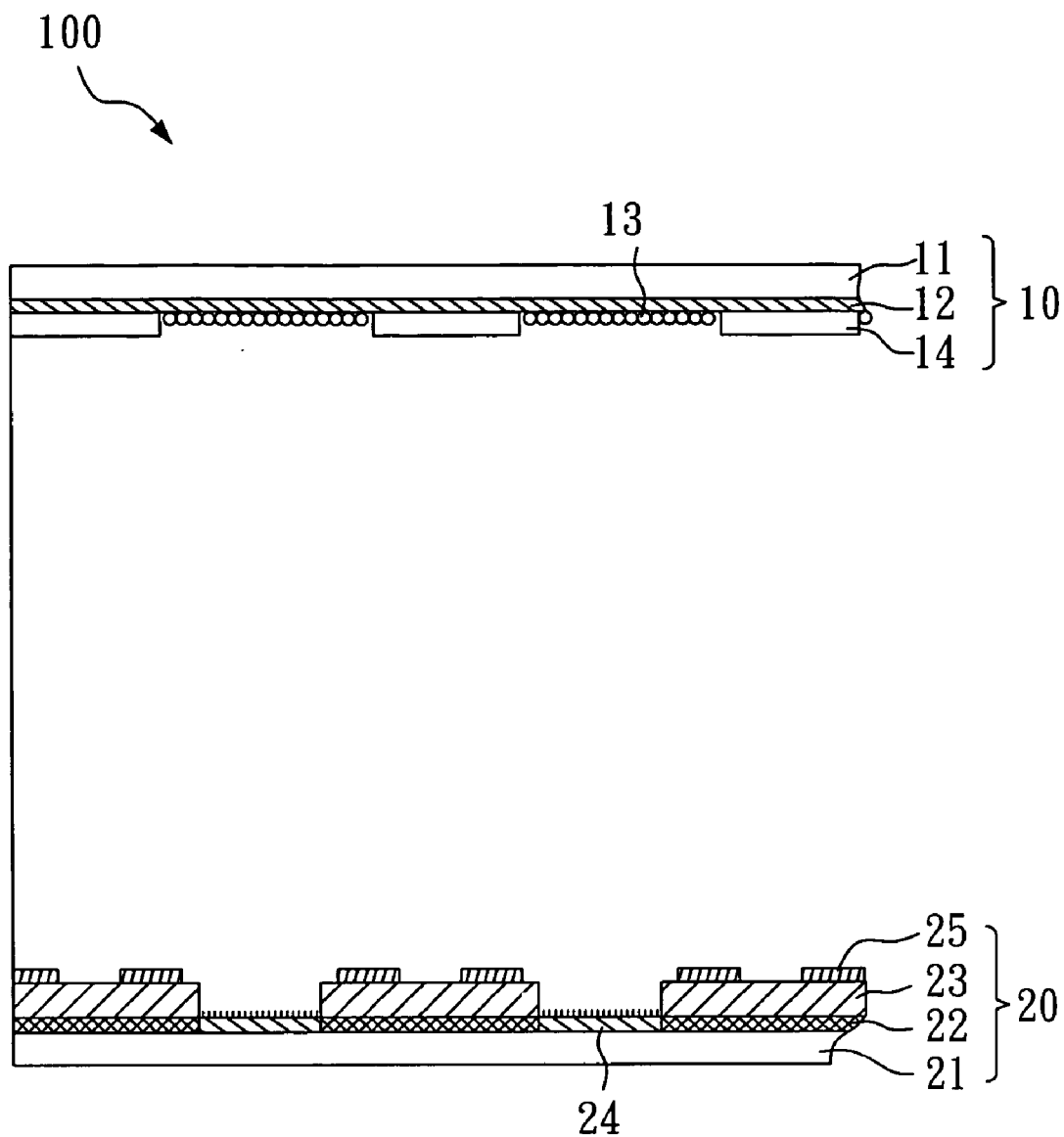
FIG. 1 is a sectional view of an FED according to the first embodiment of the present invention.

Referring to FIG. 1, a field emission display device (FED) 100 according to the first embodiment of the present invention includes a top substrate 10 and a bottom substrate 20, wherein the top substrate 10 has a transparent panel 11, an anode electrode 12, a phosphor layer 13, and a black matrix 14. The phosphor layer 13 according to the present invention, however, can be of phosphor layer or any like illumination layer. The transparent panel 11 can be made of glass or of any transparent material. The anode electrode 12 can be made of a transparent electric-conductive material such as indium tin oxide (ITO) or indium zinc oxide (IZO).

As shown in FIG. 1, the bottom substrate 20 includes a bottom panel 21, a cathode electrode 22 having a plurality of circular openings, an insulating layer 23 having a plurality of circular openings, electron emitters 24, and a gate electrode 25. The insulating layer 23 is made of a composition material of $SiO_2$; and the electron emitters 24 are made of a composition material of carbon nanotube, or of a composition material of carbon nanotube and silver powder. In the first embodiment of the present invention, the cathode electrode 22 is placed over the bottom panel 21; and the insulating layer 23 has openings the same as the openings of the cathode electrode 22, where the openings of the insulating layer 23 and of the cathode electrode 22 are of a similar shape and are arranged in a similar manner. In this embodiment, there are annular gate electrodes 25 each having an opening similar to that of the insulating layer 23 and of the cathode electrode 22, where the openings are all arranged in a manner of a circular matrix and are in a "one-to-one" relationship with plural electron emitters 24 formed on the bottom panel 21.

It is understood that the structure and shape of the cathode electrode, the insulating layer and the gate electrode are not limited to the contents described herein.

Further, in the first embodiment the electron emitters 24 that fill in the circular openings of the cathode electrode 22 are formed on the exposed portion of the bottom panel 21. In other words, the electron emitters 24 are formed directly on the even and exposed surface of the bottom panel 21, whereas the sides of the electron emitters 24 are in an electric-contact with the cathode electrode 22. By doing so, the problem of non-uniform elevation for the dispersion of electron emitters, resulted conventionally from an uneven surface due to sintering of cathode materials, can therefore be avoided.

In the first embodiment of the present invention, the electron emitters 24 has a height the same as that of the cathode electrode 22, where the electron emitters 24 not only are adjacent to the cathode electrode 22, but also are electrically-connected therewith. In this embodiment, the height of the openings that the electron emitters 24 fill in the cathode electrode 22 and in the insulating layer 23 is not limited. The height of the electron emitters 24 may be between that of the cathode electrode 22 and of the insulating layer 23; or the electron emitters 24 may have a height the same as that of the insulating layer 23. However, such concern is not to limit the scope of the present invention.

As shown in FIG. 1, the annular gate electrodes 25 are disposed on the insulating layer 23, and that the electron emitters 24 fill in the circular openings of the cathode electrode 22 and are electrical connections therewith. In the first embodiment, control is made to vary the potential applied on the cathode electrode 22 and the gate electrodes 25 so as to activate the electron emitters 24 to emit electrons at a designated time.

The electrons emitted from the electron emitters 24 are affected by the potential between the top substrate 10 and the bottom substrate 20 and as a result, move in an accelerated manner from the bottom substrate 20 toward the top substrate 10. When the electrons collide against the phosphor layer 13 on the top substrate 10, a visible light will be produced due to a reaction with the phosphor material, where the visible light will pass through the transparent panel 11 and thus can be seen.

In the first embodiment, the method for preparing the FED is not to be limited, but preferably is one of conventional methods such as screen printing process, spraying process, sputtering process, coating process, lithographic process, or etching process, so as to form a structure of an FED according to the present invention. Alternatively, the structure of FED according to the present invention can be simplified so as to reduce the manufacturing cost.

Embodiment 2

Figure 2:
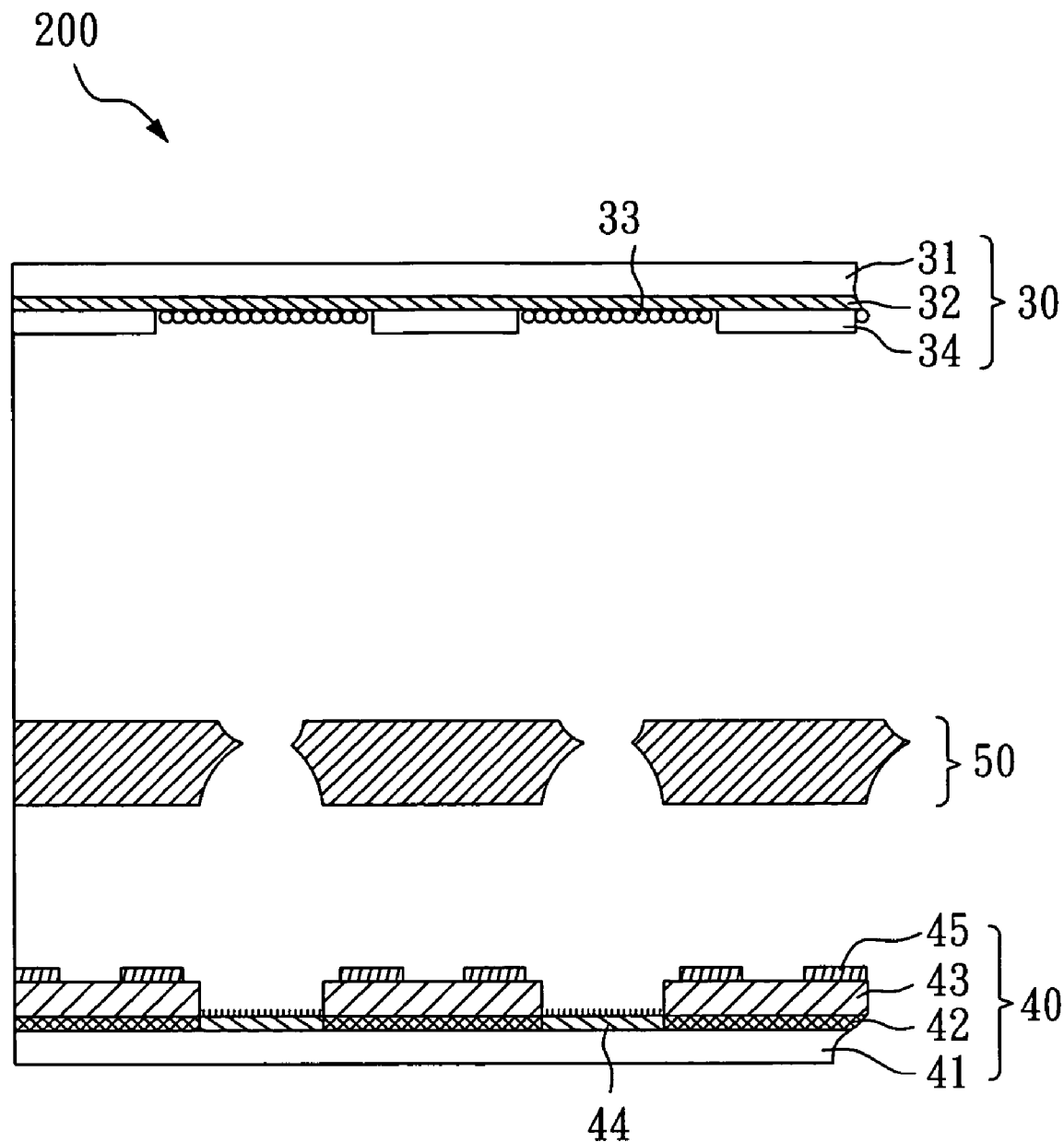
FIG. 2 is a sectional view of an FED according to the second embodiment of the present invention.

FIG. 2 shows a schematic view of an FED 200 according to a second embodiment of the present invention, comprising a top substrate 30, a bottom substrate 40 and a metal plate 50. The top substrate 40 also includes a black matrix 34. In this embodiment the structures of the top and bottom substrates 30 and 40 are similar to those taught in the first embodiment, while the FEDs 100 and 200 according to the first and second embodiments of the invention differ only in that the latter is provided additionally with a metal plate 50.

In the second embodiment of the present invention, the metal plate 50 can be of any metallic plate of ferro-nickel alloy or silver-magnesium alloy having a surface capable of electron multiplication. Plural circular openings of the metal plate 50 correspond to the circular openings of the insulating layer 23 and of the cathode electrode 22 at the bottom substrate 40. The metal plate 50 not only can multiply the number of secondary electrons, but also can isolate an influence on the bottom substrate 40 caused by a high electric field of an anode electrode 32 on the top substrate 30.

Further, in the second embodiment the metal plate 50 can be applied with a negative electric field so as to gather the electrons emitted from the electron emitters 24.

As shown in FIG. 2, the openings of the metal plate are shaped like two bowls attaching to each other at the bottoms, where the dimensions of the two bowls are not equal to each other. The openings of the metal plate 50 can gather primary electrons emitted from the electron emitters 24; while secondary electrons are produced after the primary electrons colliding against the material of electron multiplication on the surface of the metal plate 50. It is understood that the shape or dimension of the openings is not to be limited.

Embodiment 3

Figure 3:
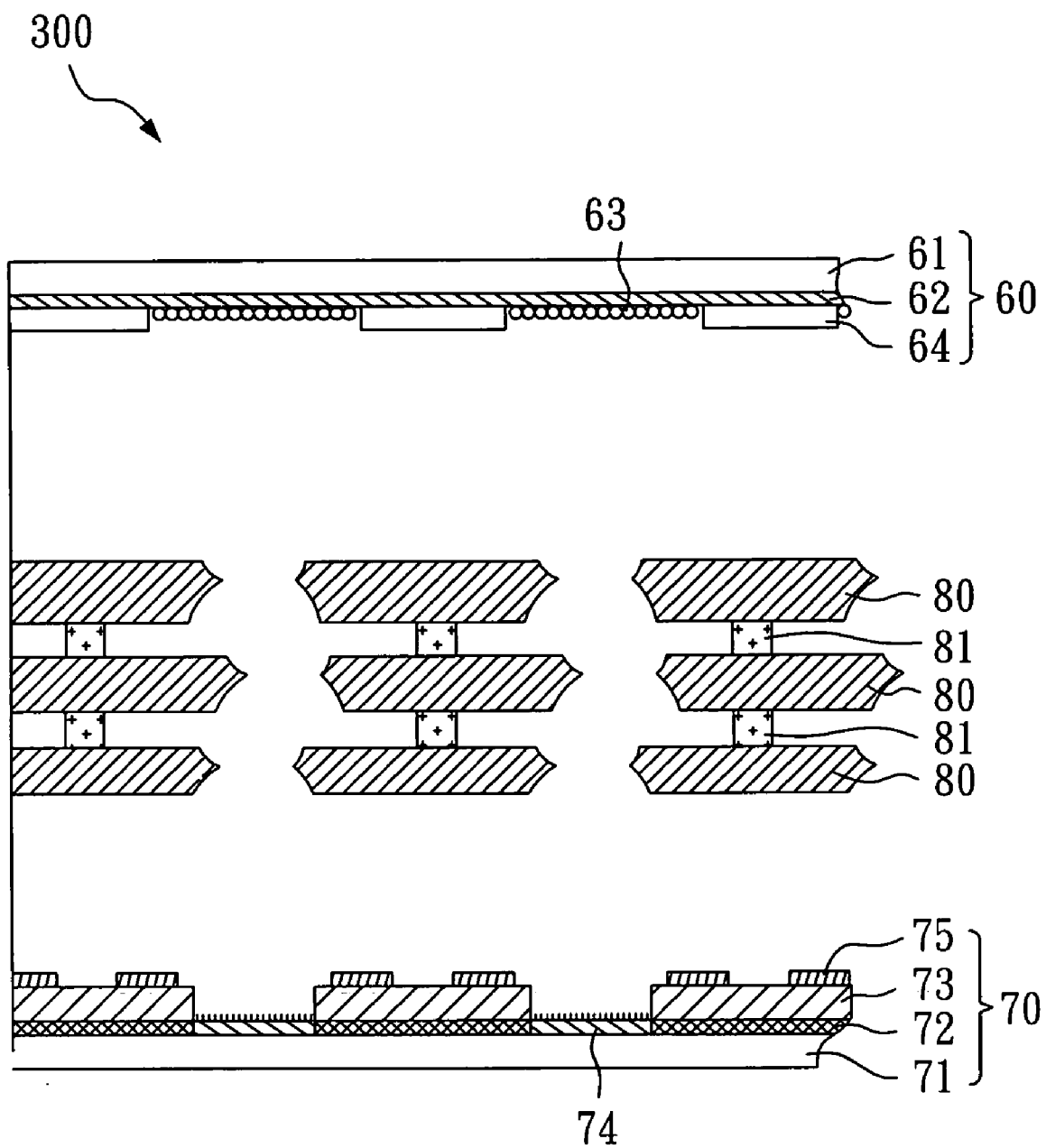
FIG. 3 is a sectional view of an FED according to the third embodiment of the present invention.

FIG. 3 shows a schematic view of an FED 300 according to a third embodiment of the present invention, comprising a top substrate 60, including a black matrix 64, a bottom substrate 70, a plurality of metal plates 80, and insulating layers 81 interposed between the metal plates 80.

In the third embodiment the structure of the FED 300 is similar to that of the FED 200 in the second embodiment, with the exception that three metal plates 80, each having a plurality of circular openings, are disposed between the top and bottom substrates 60 and 70 and that two insulating layers 81 are disposed between the metal plates 80. The insulating layers 81 are provided for maintaining stability of the structure of multiple metal plates 80 and to avoid declination thereof.

According to the third embodiment of the present invention, the structure of multiple metal plates 80 can increase the number of electron collisions and so more secondary electrons which collide against a phosphor layer 33. Even if the FED according to the third embodiment adopts a low-energized voltage, a feature of greater brightness can still be obtained.

The structures of the FEDs according to the above-mentioned embodiments of the present invention can improve the electron emitting density effectively. Further, with the help of the metal plates the number of electrons, which excite illumination of fluorescence, can be increased. As such, brightness and color contrast of the pixels can be improved so as to provide a screen of high-quality image.

Although the present invention has been explained in relation to its preferred embodiments, it is to be understood that many other possible modifications and variations can be made without departing from the scope of the invention as hereinafter claimed.

What is claimed is:

1. A field emission display, comprising:
   a top substrate;
   a bottom substrate comprising:
      at least one cathode electrode on a bottom panel and having an opening-pattern having at least one opening;
      an insulating layer on the cathode electrode, wherein the insulating layer has an opening-pattern with at least one opening, and the opening-pattern of the insulating layer is the same as that of the cathode electrode and the width of the opening of the cathode electrode and the width of the opening of the insulating layer are the same;
      at least one gate electrode on the insulating layer; and
      at least one electron emitter in an opening of the opening-pattern of the cathode electrode and the electron emitter has the same height as that of the cathode electrode, wherein the opening of the cathode electrode is filled with the electron emitter having a flat surface, and the electron emitter directly contacts the bottom panel;
   wherein the electron emitter is adjacent to the cathode electrode and is electrically connected therewith.

2. The field emission display as claimed in claim 1, wherein the insulating layer has an opening-pattern with plural openings, and the electron emitters are positioned in the openings of the cathode electrode and of the insulating layer.

3. The field emission display as claimed in claim 2, wherein the emitters are adjacent to the cathode electrode and the insulating layer, and are electrically connected with the cathode electrode.

4. The field emission display as claimed in claim 1, wherein the opening of the cathode electrode is a groove.

5. The field emission display as claimed in claim 4, wherein the opening of the cathode electrode is a groove parallel to a surface of the bottom substrate.

6. The field emission display as claimed in claim 1, wherein the gate electrodes are plural and separate from one another.

7. The field emission display as claimed in claim 1, wherein the gate electrodes are integrally made as one single piece.

8. The field emission display as claimed in claim 1, further comprising a metal plate having a plurality of openings and located between the top substrate and the bottom substrate.

9. The field emission display as claimed in claim 8, wherein the openings of the metal plate are arranged in a formation of matrix M×N, where M and N are each an integer greater than zero.

10. The field emission display as claimed in claim 9, wherein the openings of the metal plate are a plurality of grooves arranges parallel to one another and the metal plate consists of non-consecutive metal plates.

11. The field emission display as claimed in claim 8, wherein the openings for the metal plate are selected from a group of shapes consisting of a square, a circle, a polygon, an ellipse, an irregular shape, or their combination.

12. The field emission display as claimed in claim 8, wherein the openings of the metal plate are each shaped like two bowls attaching to each other at the bottoms thereof and the dimensions of the two bowls in each opening are equal.

13. The field emission display as claimed in claim 8, wherein the openings of the metal plate are each shaped like two bowls attaching to each other at the bottoms thereof and the dimensions of the two bowls in each opening are not equal.

14. The field emission display as claimed in claim 8, wherein the metal plate is an alloy.

15. The field emission display as claimed in claim 8, wherein the metallic material or alloys of the metal plates is that of silver-magnesium alloy, copper-beryllium alloy, copper-barium alloy, gold-barium alloy, gold-calcium alloy, tungsten-barium-gold alloy, ferro-nickel alloy, or a combination thereof or of a metal oxide such as oxides of beryllium, oxides of magnesium, oxides of calcium, oxides of strontium, oxides of barium, or a combination thereof.

16. The field emission display as claimed in claim 1, wherein the electron emitter is made of a carbon-based material, selected from the group of graphite, diamond, diamond-like carbon, carbon nanotube, fullerene ($C_{60}$), and the composite thereof.

17. The field emission display as claimed in claim 1, wherein the shape of the electron emitters is that of a dot or annular.

18. A field emission display, comprising:
a top substrate;
a bottom substrate comprising:
at least one cathode electrode on a bottom panel and having an opening-pattern having at least one opening;
an insulating layer on the cathode electrode, wherein the insulating layer has an opening-pattern with at least one opening, and the opening-pattern of the insulating layer is the same as that of the cathode electrode and the cathode electrode and the insulating layer share a common opening;
at least one gate electrode on the insulating layer; and
at least one electron emitter in an opening of the opening-pattern of the cathode electrode and the electron emitter has the same thickness as that of the cathode electrode, wherein the opening of the cathode electrode is filled with the electron emitter having a flat surface, and the electron emitter directly contacts the bottom panel;
wherein the electron emitter is adjacent to the cathode electrode and is electrically connected therewith.

* * * * *